(12) United States Patent
Niikura et al.

(10) Patent No.: US 6,309,020 B1
(45) Date of Patent: Oct. 30, 2001

(54) LIFTER APPARATUS FOR VEHICLE

(75) Inventors: Naoki Niikura; Hiroya Ohmori, both of Kanagawa-ken (JP)

(73) Assignee: Ikeda Bussan Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/461,337

(22) Filed: Dec. 15, 1999

(30) Foreign Application Priority Data

Dec. 17, 1998 (JP) .................................................. 10-359702

(51) Int. Cl.⁷ .................................................... A47C 1/024
(52) U.S. Cl. .................................. 297/344.1; 297/344.15; 297/344.17; 248/421
(58) Field of Search ............................ 297/344.1, 344.15, 297/344.17; 248/421

(56) References Cited

U.S. PATENT DOCUMENTS 5,337,995 * 8/1994 Satoh et al. ....................... 248/421 X
5,709,363 * 1/1998 Matsuhashi et al. ................ 248/421
5,806,824 * 9/1998 Isomura et al. .................. 248/421 X

* cited by examiner

*Primary Examiner*—Peter M. Cuomo
*Assistant Examiner*—Rodney B. White
(74) *Attorney, Agent, or Firm*—Nath & Associates PLLC; Gary M. Nath; Marvin C. Berkowitz

(57) ABSTRACT

A lead screw which is to be moved in a direction. A nut is screwed to the lead screw. A first bracket is to be swung by moving the lead screw so as to move a seat up and down. The first bracket has a first opening. The nut is fitted in the first opening. A second bracket is to move the seat up and down with the first bracket. The second bracket has a second opening of a size larger than that of the first opening. The second opening is to pass the nut in an inclined position therethrough. The second opening is to position the nut therein.

10 Claims, 2 Drawing Sheets

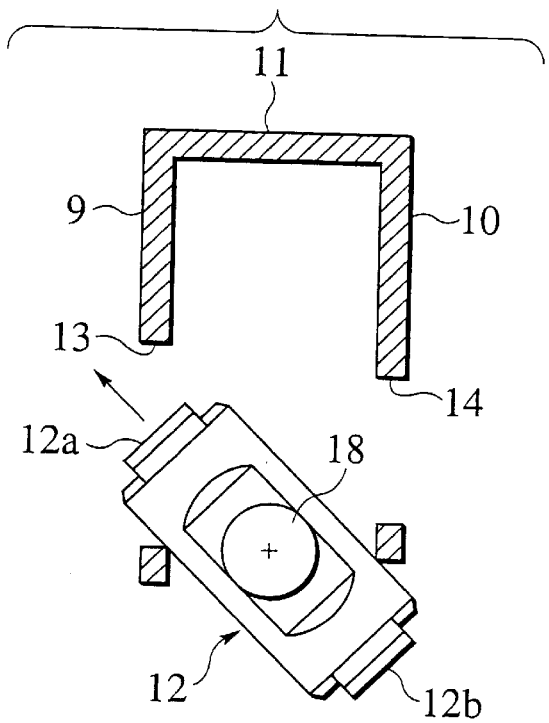
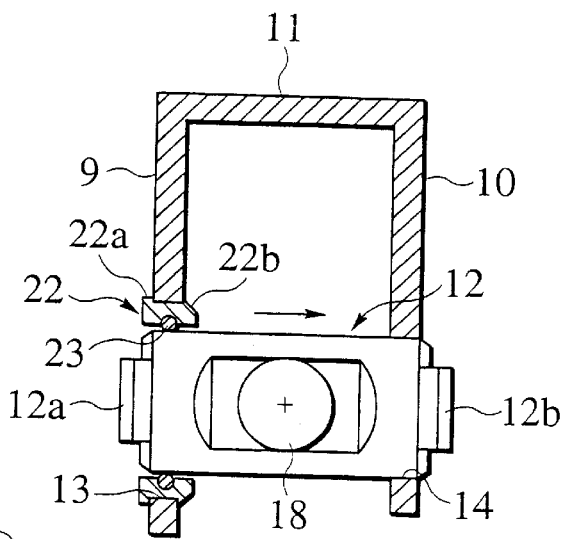
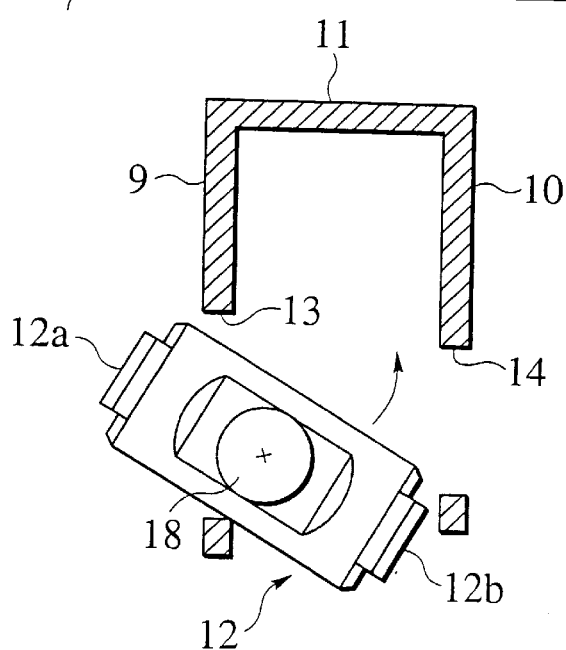

ized opening in the large size opening
LIFTER APPARATUS FOR VEHICLE

BACKGROUND OF THE INVENTION

1. Field of the Invention

The present invention relates to a lifter apparatus for a vehicle seat which moves a seat cushion up and down.

2. Description of Relevant Art

A seat of a vehicle is provided with a lifter apparatus which moves a seat cushion up and down to adjust a viewpoint height of a sitting person or feeling of sitting. In this kind of the lifter apparatus, a shaft to be rotated is provided between a pair of movable rails which are fixed to both sides of a seat cushion and a lever which is mounted to an end portion of the shaft. The shaft is fixed with a pair of bracket pieces to rotate the shaft in itself. These bracket pieces each are formed with a supporting opening of the same size, and a nut in a cylindrical shape is previously mounted in the supporting openings with the nut passing through supporting openings. The nut is screwed by a lead screw which projects from a motor fixed on a side of the movable rail. When the lead screw is rotated, the bracket pieces swing forward and backward, the shaft is rotated in a direction where the bracket pieces swing. A spacer is mounted to a tip end of the lead screw which passes through the nut, the spacer to prevent the nut from coming off.

SUMMARY OF THE INVENTION

In this conventional structure, however, a rotating lead screw is screwed to a nut, the nut having been previously mounted between bracket pieces. Consequently, assembly of the nut and the lead screw together takes much work. That is, in a small space below a seat, the lead screw is screwed to the nut while rotating the lead screw by hand or temporarily rotating it by a motor supplied with electricity. As a result, the assembly operation is difficult and needs skill.

Further, after the lead screw is screwed to the nut in the small space below the seat, a further operation in which a stopper is mounted to a tip end of the lead screw that passes through the nut must also be performed. This point causes the assembly operation to be difficult.

An object of the invention is to provide a lifter apparatus in which, in a small space below a seat, it is not necessary for a lead screw to be screwed to a nut and for a stopper to be mounted to a tip end of the lead screw.

To achieve this object, in a first aspect of the invention, there is provided a lifter apparatus for a vehicle seat having a lead screw which is to be moved in a direction. A nut is screwed to the lead screw. By moving the lead screw a first bracket is swung so as to move a seat up and down. The first bracket has a first opening. The nut is fitted in the first opening. A second bracket moves the seat up and down with the first bracket. The second bracket has a second opening of a size larger than that of the first opening. The nut is inserted into the second opening in an inclined position.

Preferably, the lifter apparatus further has a spacer fittingly mounted between the nut and a wall defining the second opening.

Preferably, the lifter apparatus further has a ring member which is provided between the nut and the spacer.

Preferably, the lifter apparatus further has a shaft to be rotated connecting to the second bracket. The shaft has a side face. The second bracket has a connecting portion in a shape corresponding to the side face. The connecting portion is fixed to the shaft.

From a second aspect of the invention, there is provided an assembly method of a lifter apparatus for a vehicle seat. The method has the steps of: passing a nut in an inclined position through a second opening of a second bracket; and fitting the nut in a first opening of a first bracket.

Preferably, the assembly method further has the step of: fitting a spacer between the nut and a wall defining the second opening.

According to the invention, since a size of the second opening in the second bracket is larger than the size of the first opening, the nut can be inserted in the large size opening in an inclined position. After inserting the nut in the inclined position, the nut is rotated between the first bracket and the second bracket and passed through a first opening of the first bracket. The nut is passed through both openings while the lead screw is rotating. The nut and a stopper are pre-mounted to the lead screw. Therefore, it is not necessary for the lead screw to be screwed to the nut and for the stopper to be mounted to a tip end of a lead screw in a small space below a seat.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 3 is a cross sectional view which shows a state where an end portion of a nut in an inclined position is inserted in a large supporting opening of a bracket piece;

FIG. 4 is a cross sectional view which shows a state where another end portion of a nut is rotated to have a horizontal position; and FIG. 5 is a cross sectional view which shows a state where a nut is passes through supporting openings and a spacer is fittingly mounted.

DETAILED DESCRIPTION OF THE PREFERRED EMBODIMENTS

The contents of Japanese Patent Application No. 10-361166 are incorporated herein by reference.

A preferable embodiment of the invention is explained according to FIGS. 1 to 5.

Figure 1:
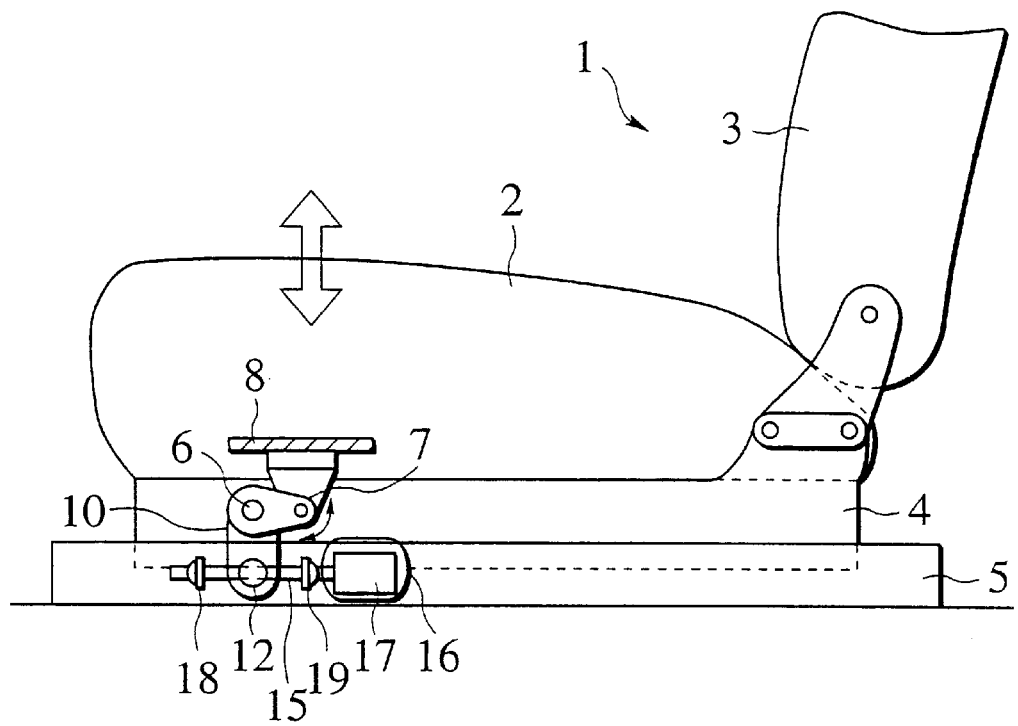
FIG. 1 is a schematic side view of a front seat in which a lifter apparatus according to an embodiment of the invention is assembled.

In FIG. 1, a front seat 1 of a vehicle has a seat cushion 2 and a seat back 3. A movable rail 4 is fixed to a lower face of the seat cushion 2 and a stationary rail 5 is fixed on a floor of a vehicle body. The movable rail 4 is slidably engaged with the rail 5, and the front seat 1 is moved forward and backward.

Between right and left movable rails 4, a shaft 6 to be rotated is provided along a widthwise direction of a vehicle. To both end portions of shaft 6, a lever 7 is fixed. At a tip end of lever 7, there is rotatably supported a base 8 which supports a lower face of seat cushion 2. Therefore, rotating shaft 6 moves base 8 up and down, and seat cushion 2 on base 8 moves up and down with base 8, thus achieving a lifter function.

Next, a mechanism to rotate shaft 6 is explained. To shaft 6, there are fixed a pair of brackets 9, 10 facing each other at a predetermined interval. Bracket piece 9 corresponds to a second bracket and bracket piece 10 corresponds to a first bracket. Both bracket pieces 9, 10 are integrated together through a connecting portion 11 which has a section in a curved-shape corresponding to a side face of shaft 6. Connecting portion 11 is fixed to the side face of shaft 6 by screwing means (not shown). Bracket pieces 9, 10 are integrated together through connecting portion 11 at a constant interval between bracket pieces 9, 10.

Bracket piece 9 is formed with a supporting opening 13, or second opening, of a size larger than a diameter of nut 12 as described later. Bracket piece 10 is formed with a supporting opening 14, or first opening, of approximately the same size as nut 12. Nut 12, in a cylindrical shape, is pre-mounted to a lead screw 15, remote from front seat 1, and is passed through both supporting openings 13, 14.

Figure 2:
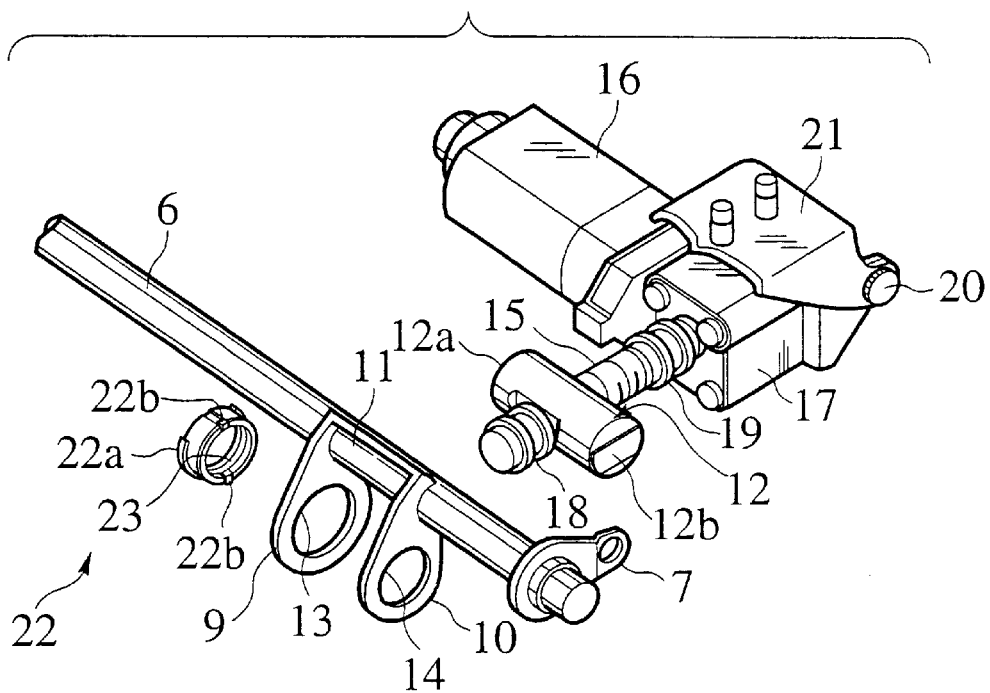
FIG. 2 is an exploded perspective view which shows a structure around a shaft to be rotated.

Next, as shown in FIG. 2, lead screw 15 projects from motor 16 through a gear unit 17. Cylindrical-shaped nut 12 is pre-screwed to lead screw 15. Stoppers 18, 19 are adhesively mounted to a tip end and a base end of lead screw 15 which prevent nut 12 from coming off and from moving. Assembly of nut 12 and stoppers 18, 19 need not be performed in a small space below seat cushion 2. A motor 16 and a gear unit 17 are mounted to a stationary fittings 21 though a hinge 20. After nut 12 is passed through bracket pieces 9, 10, fittings 21 is fixed to a reinforcing member (not shown) which is provided in an inclined position between movable rail 4 and a cross-member, the cross-member (not shown) being mounted to a front end of movable rail 4.

Next, a procedure is explained hereinafter according to FIGS. 3 to 5 that bracket pieces 9, 10 are mounted to a device in which nut 12 and stoppers 18, 19 are previously mounted to lead screw 15.

At first, one end portion 12a of nut 12 is inserted from a lower side between both bracket pieces 9, 10. End portion 12a is inserted in an inclined position in a supporting opening 13 of a large size (refer to FIG. 3). A size of supporting opening 13 is previously set to accommodate end portion 12a of nut 12 being inserted in an inclined position. Next, end portion 12a is further inserted in supporting opening 13 until the other end portion 12b is arranged between bracket pieces 9, 10. Nut 12 is then rotated to a horizontal position (refer to FIG. 4). After having a horizontal orientation, nut 12 is slid toward a side of end portion 12b and inserted in supporting opening 14 of the same size as nut 12 (refer to FIG. 5).

According to this, nut 12 through each supporting opening 13, 14, and a stationary fitting 21 on a side of motor 16 is fixed to a reinforcing member (not shown) on a side of movable rail 4. Next, as shown in FIG. 5, a resin-made spacer 22 in a ringed-shape is fitted between end portion 12a of nut 12 and supporting opening 13. Spacer 22 has a side face which is formed with a projection 22a n an arc shape. An edge portion of opening 13 is held between the arc-shaped projection 22a and an elastic claw 22b which is formed at a position in opposition to spacer 22. A metal ring 23 is provided to an inner face of spacer 22. Therefore, nut 12, and metal ring 23 have a stable line of contact with each other, thus preventing noise from being generated. Fittings 21 is fixed to a reinforcing member (not shown) so as to be set at a position preventing nut 12 from coming off out of openings 13, 14 and allows for a mounting position of fittings 21 to have a little error.

In this manner, after mounting nut 12, when lead screw 15 is rotated by motor 16, bracket pieces 9, 10 swing forward and backward rotating shaft 6 and lever 7 at an end portion of it is rotated, thus moving seat cushion 2 up and down. Though a position of nut 12 moves up and down when swinging the bracket pieces 9, 10 forward and backward, motor 16, gear unit 17, and lead screw 15, connected to fittings 21 through a hinge 20, accommodate this change of a vertical position of nut 12.

What is claimed is:

1. A lifter apparatus for a vehicle seat, comprising:

a rotatable threaded rod having a first engagement member movably screwed thereto;

a rotatable shaft associated with the threaded rod, the shaft having a second engagement member rotatable therewith, the second engagement member including a first link with a first opening and a second link with a second opening, the first link and the second link being apart from each other, the second engagement member being engaged with the first engagement member, said first engagement member being inserted in the first opening and the second opening; and a spacer inserted in the second opening between the first engagement member and the second link.

2. A lifter apparatus according to claim 1, wherein the spacer comprises a contact member in line contact with the first engagement member.

3. A lifter apparatus according to claim 1, wherein the second engagement member comprises a connecting portion connected between the first link and the second link.

4. An assembly method of a lifter apparatus for a vehicle seat, comprising:

positioning a first engagement member of a threaded rod relative to a second engagement member of a shaft;

inserting the first engagement member in an inclined position through a second opening of a second link of the second engagement member;

rotating the first engagement member to face a first opening of a first link of the second engagement member;

inserting the first engagement member in the first opening of the first link; and inserting a spacer in the second opening of the second link between the first engagement member and the second link.

5. A vehicle seat comprising:

a rotatable threaded rod having a first engagement member movably screwed thereto;

a rotatable shaft associated with the threaded rod, the shaft having a second engagement member rotatable therewith, the second engagement member including a first link with a first opening and a second link with a second opening, the first link and the second link being apart from each other, the second engagement member being engaged with the first engagement member, said first engagement member being inserted in the first opening and the second opening;

a spacer inserted in the second opening between the first engagement member and the second link; and a seat to be lifted associated with the shaft.

6. A vehicle seat according to claim 5, further comprising:

a third link between the seat and the shaft, the third link being rotatable with the shaft, the third link being rotatably connected to the shaft.

7. A vehicle seat according to claim 5, wherein the spacer comprises a contact member in line contact with the first engagement member.

8. A vehicle seat according to claim 5, wherein the second engagement member comprises a connecting portion connected between the first link and the second link.

9. A vehicle seat according to claim 5, wherein the second opening is larger in size than the first opening.

10. A lifter apparatus according to claim 1, wherein the second opening is larger in size than the first opening.

* * * * *